United States Patent
Lee et al.

(10) Patent No.: US 9,559,599 B2
(45) Date of Patent: Jan. 31, 2017

(54) ELECTRONIC APPARATUS FOR GENERATING A PULSE WIDTH MODULATION AND POWER CONTROLLING METHOD THEREOF

(71) Applicant: SAMSUNG ELECTRONICS CO., LTD., Suwon-si (KR)

(72) Inventors: Jin-hyung Lee, Anyang-si (KR); Gil-yong Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 14/306,682

(22) Filed: Jun. 17, 2014

(65) Prior Publication Data

US 2015/0131332 A1 May 14, 2015

(30) Foreign Application Priority Data

Nov. 12, 2013 (KR) .................. 10-2013-0137015

(51) Int. Cl.
*H02M 3/335* (2006.01)
*H02M 1/00* (2006.01)

(52) U.S. Cl.
CPC . *H02M 3/33523* (2013.01); *H02M 2001/0032* (2013.01); *H02M 2001/0035* (2013.01); *Y02B 70/16* (2013.01)

(58) Field of Classification Search
CPC ............. H02M 2001/0032; H02M 2001/0035
USPC ................... 363/13, 15–16, 20, 21.01, 21.04, 21.09,363/21.1, 21.11–21.12, 21.17–21.18
See application file for complete search history.

(56) References Cited

U.S. PATENT DOCUMENTS

| | | | | |
|---|---|---|---|---|
| 5,457,624 A | * | 10/1995 | Hastings | H02M 3/158 363/127 |
| 2001/0010638 A1 | * | 8/2001 | Konno | H02M 3/335 363/21.07 |
| 2002/0067629 A1 | * | 6/2002 | Koike | H02M 3/33523 363/97 |
| 2005/0073867 A1 | * | 4/2005 | Byun | H02M 3/33561 363/84 |
| 2007/0007938 A1 | * | 1/2007 | Djenguerian | H02M 3/33507 323/284 |
| 2009/0129130 A1 | | 5/2009 | Young et al. | |
| 2010/0194198 A1 | * | 8/2010 | Djenguerian | H02M 3/33507 307/31 |
| 2010/0194445 A1 | * | 8/2010 | Balakrishnan | H02M 3/33507 327/108 |

(Continued)

*Primary Examiner* — Jessica Han
*Assistant Examiner* — David A. Singh
(74) *Attorney, Agent, or Firm* — Sughrue Mion, PLLC

(57) ABSTRACT

An electronic apparatus includes a system portion configured to operate with a received voltage, and a power supply including a pulse width modulation (PWM) generator to generate a PWM signal, a converter to transfer voltage from a primary side to a secondary side in accordance with an output voltage of the PWM generator, and an output portion to supply voltage at the secondary side as standby voltage to the system portion, the PWM generator receives feedback on the standby voltage at the secondary side of the converter, the PWM signal is turned on/off in accordance with levels of the standby voltage at the secondary side, and voltage being supplied to components, except, when the PWM signal is turned off, voltage at the secondary side is only supplied to a component that monitors the feedback of the standby voltage.

19 Claims, 7 Drawing Sheets

(56) References Cited

U.S. PATENT DOCUMENTS

| | | | |
|---|---|---|---|
| 2010/0321957 A1* | 12/2010 | Sha | H02M 3/33507 363/20 |
| 2010/0321963 A1* | 12/2010 | Yamashita | H02M 3/33507 363/21.17 |
| 2011/0096574 A1* | 4/2011 | Huang | H02M 3/33507 363/21.18 |
| 2013/0003421 A1* | 1/2013 | Fang | H02M 3/33523 363/21.01 |
| 2013/0141944 A1 | 6/2013 | Hu et al. | |
| 2014/0036552 A1* | 2/2014 | Saji | H02M 1/44 363/21.17 |
| 2014/0198535 A1* | 7/2014 | Yang | H02M 3/33523 363/16 |
| 2014/0233275 A1* | 8/2014 | Yang | H02M 3/33576 363/21.17 |
| 2014/0268913 A1* | 9/2014 | Zheng | H02M 7/2176 363/21.13 |
| 2014/0307484 A1* | 10/2014 | Yang | H02M 3/33569 363/21.12 |
| 2015/0117066 A1* | 4/2015 | Schmid | H02M 3/33523 363/21.01 |
| 2015/0180355 A1* | 6/2015 | Freeman | H02M 1/08 363/21.04 |

* cited by examiner

ELECTRONIC APPARATUS FOR GENERATING A PULSE WIDTH MODULATION AND POWER CONTROLLING METHOD THEREOF

CROSS-REFERENCE TO RELATED APPLICATION

This application claims priority from Korean Patent Application No. 10-2013-0137015, filed on Nov. 12, 2013 in the Korean Intellectual Property Office, the disclosure of which is incorporated herein by reference.

BACKGROUND

Field

Apparatuses and methods consistent with the exemplary embodiments relate to an electronic apparatus and a power controlling method thereof, and more particularly to an electronic apparatus and a power controlling method thereof, in which standby power consumption is controlled.

Description of the Related Art

An electronic apparatus including a display apparatus such as a television is provided with a power supply for supplying power needed for operation. The electronic apparatus has a plurality of power modes, and enters a standby mode where voltage being supplied to some components is cut off in order to reduce power consumption if a predetermined time has elapsed without performing any operation.

Although the electronic apparatus enters the standby mode, standby power has to be supplied to a system part so as to perform minimum operation. To this end, the electronic apparatus may include a standby AC/DC converter circuit as a standby-power supply that generates the standby power.

FIG. 1 shows a conventional standby-power supply.

As shown in FIG. 1, a standby-power supply 10 may be achieved by a standby AC/DC converter circuit. Referring to FIG. 1, the conventional standby-power supply 10 operates as follows.

If alternating current (AC) power is applied via a bridge rectifier circuit 11, a pulse width modulation (PWM) integrated circuit (IC) 12 generates a PWM signal. High voltage start-up of the PWM IC 12 makes a switching device Q1 start a switching operation, and voltage VCC makes the PWM IC perform a normal operation, thereby outputting direct current (DC) power as standby power.

Specifically, a pulse voltage generated in the PWM IC 12 is switched by Q1, applied to a secondary side in accordance with a transformation ratio of a transformer 14, and output as a DC voltage to a system part (not shown) for performing the operation of the electronic apparatus via a rectifier D1 and an electrolyte capacitor. The output DC voltage is fed back to a feedback terminal F/B of the PWM IC 12, and thus undergoes regulation based on feedback control of the PWM IC 12.

However, the conventional standby-power supply 10 shown in FIG. 1 always operates in the standby mode of the electronic apparatus, and thus causes loss of power. Also, a circuit itself between the primary and secondary sides of the AC/DC converter 10 causes loss of power transformation regardless of load. That is, standby AC/DC conversion continuously causes loss in the standby mode, and therefore increases the standby power.

Accordingly, in order to decrease the standby power, a gate output of the PWM IC 12 is controlled by the output feedback voltage at the standby mode in such an intermittent manner of switching (e.g., a burst mode or a pulse skip mode,) thereby changing operating times, frequencies, etc. of the switching device Q1.

However, if the burst cycle is extremely lowered (for example, into 1 kHz or lower) so as to decrease the standby power, energy is not normally supplied to the output when an output current is suddenly varied in a section where PWM does not operate, thereby generating a dip of the output voltage, that is, voltage collapse extremely and thus causing a trouble in the system portion.

SUMMARY

According to an aspect of an exemplary embodiment, an electronic apparatus including a system portion configured to operate with a received voltage, and a power supply, the power supply including a pulse width modulation (PWM) generator configured to generate a PWM signal, a converter configured to transfer voltage from a primary side to a secondary side in accordance with an output voltage of the PWM generator, and an output portion configured to supply voltage at the secondary side of the converter as a standby voltage to the system portion, wherein the PWM generator receives feedback on the standby voltage at the secondary side of the converter, the PWM signal is turned on/off in accordance with levels of the standby voltage at the secondary side, and the voltage being supplied to components except, when the PWM signal is turned off, the voltage on the secondary side is only supplied to a component configured to monitor the feedback of the standby voltage.

The PWM signal may be turned on if the standby voltage at the secondary side is equal to or lower than a first reference voltage, and turned off if the standby voltage at the secondary side is higher than a second reference voltage.

The power supply may further include a switch configured to operate in accordance with outputs of the PWM generator, and the switch may have a nonlinear switching cycle in accordance with voltage levels at the secondary side of the converter.

The electronic apparatus may further include a controller configured to monitor the standby voltage at the secondary side of the converter and control the PWM generator.

The controller may monitor voltage of the system portion, and outputs a wake-up signal to the PWM generator if the controller receives an external input signal from the system portion.

The external input signal is input in response to releasing the system portion from a standby mode.

The system portion may apply the external input signal to the controller before a point of time when an output current of the power supply is varied.

The PWM generator may continuously generate the PWM signal if the wake-up signal is received.

The generated PWM signal may have a high speed frequency.

According to an aspect of another exemplary embodiment, a power controlling method of an electronic apparatus is provided including a system portion configured to operate with received voltage, and a power supply configured to include a pulse width modulation (PWM) generator generating a PWM signal and supply standby power to the system portion, the method including monitoring a standby voltage at a secondary side of a converter that transfers a voltage from a primary side to the secondary side in accordance with output voltages of the PWM generator, and controlling the PWM signal to be turned on/off in accordance with levels of the voltage at the secondary side of the converter, such that when the PWM signal is turned off, the voltage at the secondary side is only supplied to a component configured to monitor the feedback of the standby voltage.

The controlling the PWM signal to be turned on/off may include turning on the PWM signal if the standby voltage at the secondary side is equal to or lower than a first reference voltage, and turning off the PWM signal if the standby voltage at the secondary side is higher than a second reference voltage.

The power supply may further include a switch operating in accordance with outputs of the PWM generator, and the switch may have a nonlinear switching cycle in accordance with standby voltage levels at the secondary side of the converter.

The method may further include monitoring a voltage of the system portion.

The method may further include receiving an external input signal from the system portion by the power supply, and outputting a wake-up signal to the PWM generator in response to the external input signal.

The external input signal may be input in response to releasing the system portion from a standby mode.

In the receiving the external input signal, the system portion may apply the external input signal to the controller before a point of time when an output current of the power supply is varied.

The method may further include continuously generating the PWM signal if the wake-up signal is received.

The generated PWM signal may have a high speed frequency.

According to an aspect of another exemplary embodiment, an electronic apparatus is provided including a system portion configured to operate with received power, and a power supply configured to include a pulse width modulation (PWM) generator configured to generate a PWM signal, a converter configured to transfer voltage from a primary side to a secondary side in accordance with an output voltage of the PWM generator, an output portion configured to supply a standby voltage at the secondary side of the converter as standby power to the system portion, and a controller which monitors voltage at the secondary side of the converter and control the PWM signal to be turned on/off in accordance with levels of the standby voltage at the secondary side of the converter, wherein voltage being supplied to components, except a component for the feedback of the standby voltage at the secondary side is cut off during an off section of the PWM signal.

The controller may monitor voltage of the system portion, and output a wake-up signal to the PWM generator if the power supply receives an external input signal from the system portion.

The system portion may apply the external input signal to the controller before a point of time when an output current of the power supply is varied.

The PWM generator may generate the PWM signal having a high speed frequency when receiving the wake-up signal.

According to an aspect of an exemplary embodiment, a power supply is provided, including a pulse width modulation (PWM) generator configured to generate a PWM signal, a converter configured to transfer a voltage generated in accordance with the PWM signal from a first side of the power supply to a second side of the power supply, and an output portion configured to rectify the voltage at the second side to output a standby voltage, such that the PWM generator receives feedback of the standby voltage from the second side and turns the PWM signal on or off in accordance with the feedback of the standby voltage, the PWM signal is turned on if the feedback of the standby voltage at the second side is equal to or lower than a first threshold voltage, and the PWM signal is turned off if the feedback of the standby voltage at the second side is higher than a second threshold voltage.

The power supply may further include a system portion configured to receive the standby voltage from the output portion.

The power supply may also include a controller configured to monitor the standby voltage at the second side and receive an external input signal from the system portion, such that the PWM generator continuously generates the PWM signal if the external input signal is received.

According to an aspect of an exemplary embodiment, there is provided a method for controlling a power supply, the method including generating a PWM signal, transferring a voltage generated in accordance with the PWM signal from a first side of the power supply to a second side of the power supply, rectifying the voltage at the second side to output a standby voltage, receiving feedback of the voltage from the second side, and turning the PWM signal on or off in accordance with the feedback of the voltage, such that the PWM signal is turned on if the voltage at the second side is equal to or lower than a first threshold voltage, and the PWM signal is turned off if the voltage at the first side is higher than a second threshold voltage.

The method may also include outputting the standby voltage to a system portion.

The method may further include monitoring the voltage at the second side, and receiving an external input signal from the system portion, wherein the PWM generator continuously generates the PWM signal if the external input signal is received.

The system portion is separate from the power supply.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Hereinafter, exemplary embodiments will be described in detail with reference to the accompanying drawings. In the following description, constituent parts or elements directly related to the embodiments will be described only, and descriptions of other parts or elements will be omitted. However, it should be noted that the omitted parts or elements are not construed as being unnecessary in configuring a device or system according to the exemplary embodiments.

Figure 1:
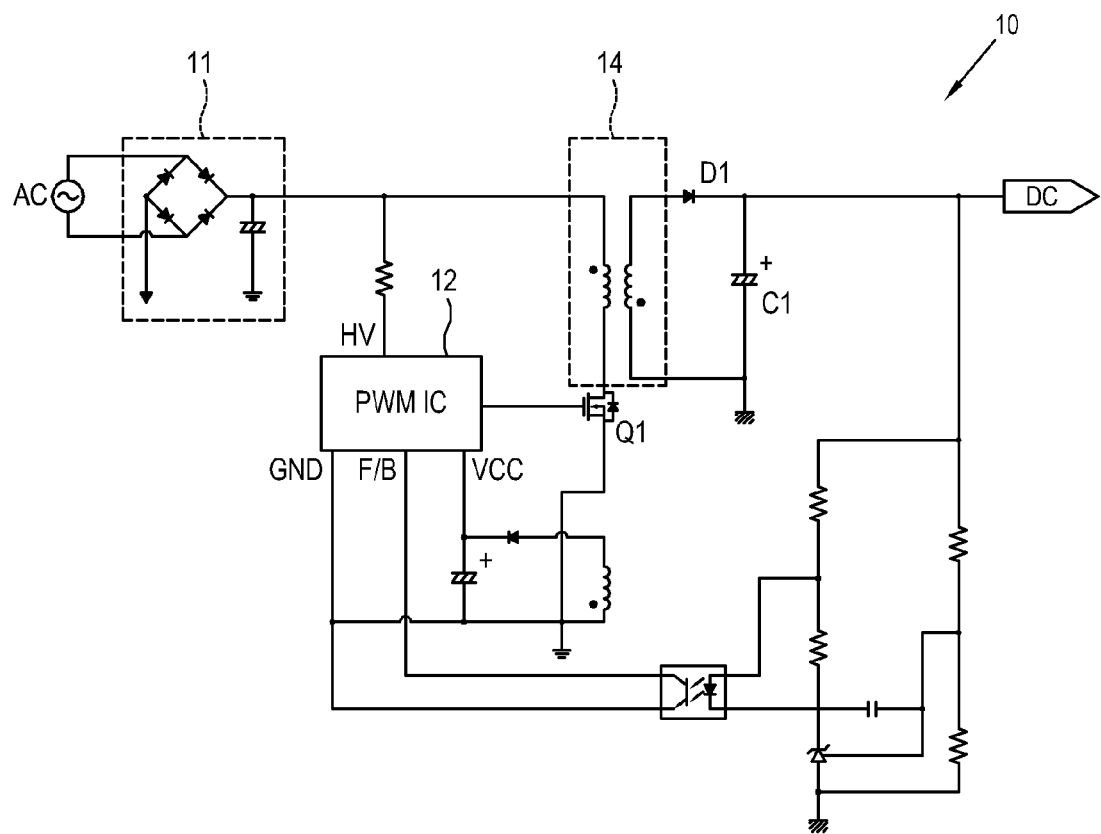
FIG. 1 is a view showing a related art standby-power supply.
Figure 2:
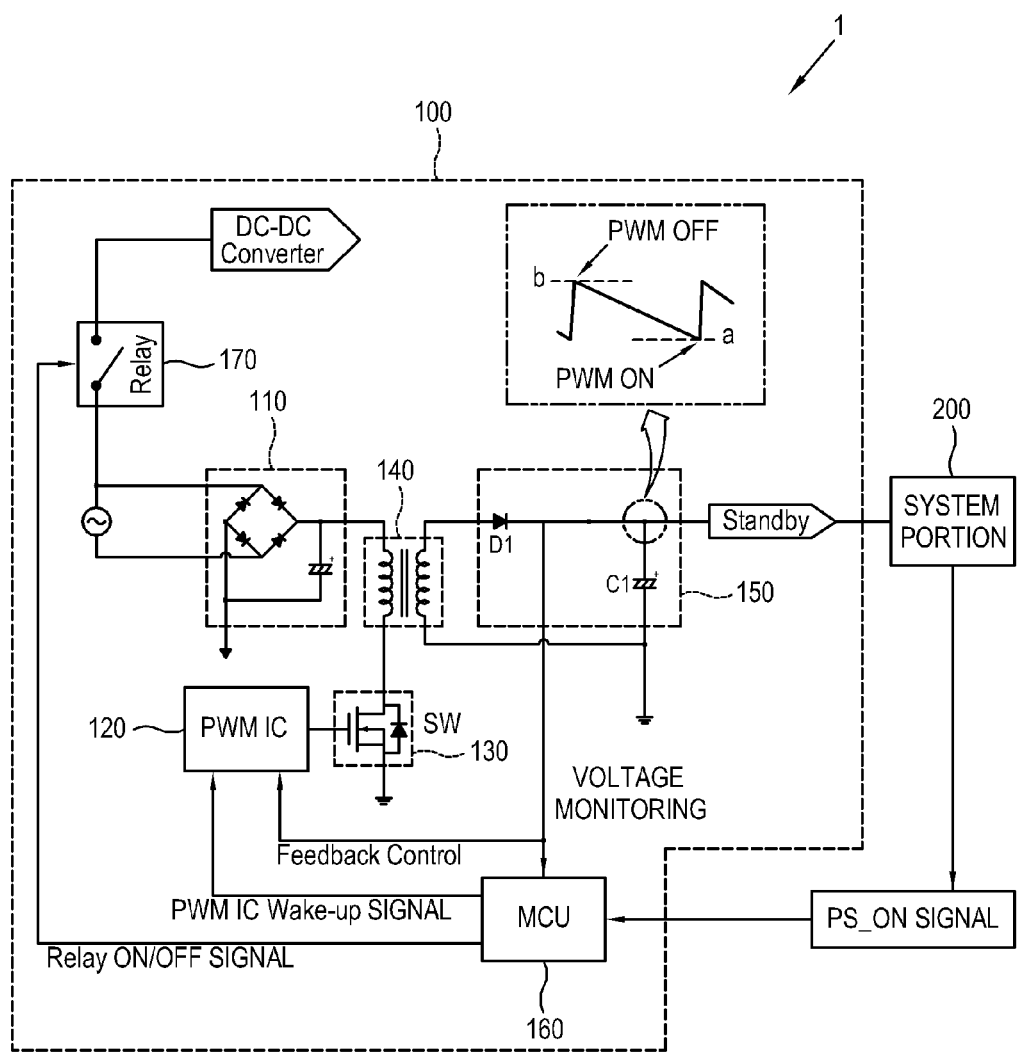
FIG. 2 is a block diagram showing an electronic apparatus according to an exemplary embodiment.

FIG. 2 is a block diagram showing an electronic apparatus 1 according to an exemplary embodiment.

The electronic apparatus 1 may include a television, a monitor, and the like display apparatus; an MP3 player, a mobile phone, and the like portable terminal; and a desktop computer, a laptop computer and the like computer; etc.

As shown in FIG. 2, the electronic apparatus 1 may include a power supply 100 for supplying standby power to a system portion 200, and a system portion 200 for performing operations.

The system portion 200 performs the operations of the electronic apparatus 1. For example, if the electronic apparatus 1 is the display apparatus, the system portion 200 processes an image signal received from an external image source in accordance with preset imaging processes and displays the processed image signal as an image. To this end, the system portion 200 may include an image processor for processing the image signal, a display for displaying the image signal as an image, a communicator for communicating with an exterior, a storage for storing a variety of data, and a central processing unit (CPU) for controlling the display apparatus.

The system portion 200 has a plurality of power modes, and the electronic apparatus 1 enters a standby mode where power being supplied to some components is cut off if a predetermined time is elapsed while the system portion 200 does not perform any operation.

For example, the display apparatus may supply power to the communicator which communicates with a remote controller for receiving a user's command under the standby mode or sensing a universal serial bus (USB) or the like external input. If the controller of the display apparatus senses the external input through the communicator, the system portion 200 is released from the standby mode and enters to a normal mode.

The power supply 100 performs a part of the functions of the power supply for supplying power to the system portion 200. In this exemplary embodiment, the power supply 100 is a standby-power supply or standby-power supply achieved by a standby AC/DC converter circuit, which converts AC power into DC power and outputs standby power to the system portion 200 of the standby mode.

As shown in FIG. 2, the power supply 100 includes a bridge rectifier 110 rectifying input AC power; a pulse width modulation (PWM) generator 120 connected to a primary high voltage side passed through the bridge rectifier 110 and generating a PWM signal; a switch 130 operating by receiving output voltage from the PWM generator 120; a converter 140 for applying a high cycle switching voltage generated by the PWM generator 120 to a secondary side; an output portion 150 rectifying the voltage at the secondary side of the converter 140 and outputting DC power, i.e., standby power; a controller 160 monitoring a voltage of the output standby power and a voltage of the system portion 200 and controlling the PWM generator 120; and a relay 170 turned on/off in response to a control signal (i.e., a relay on/off signal) output from the controller 160.

The PWM generator 120 is achieved by a power control IC of a single chip, and generates the PWM signal by intermittently performing an operation in accordance with levels of the standby power at the secondary side of the converter 140. Specifically, the PWM generator 120 monitors the secondary voltage in a manner of receiving feedback of the standby power at the secondary side of the converter 140, and performs the operation (PWM ON) if the secondary voltage is equal to or lower than a first reference voltage but stops the operation (PWM OFF) if the secondary voltage is higher than a preset second reference voltage in accordance with monitoring results. If the PWM generator 120 performs the operation, the PWM signal is generated and therefore the switch 130 operates, thereby supplying power to the secondary side of the converter 140.

In this exemplary embodiment, a mode where the PWM generator 120 performs the operation in accordance with the levels of the secondary voltage will be called an ON/OFF control mode, and a section where the operation is performed in the ON/OFF control mode will be called an ON/OFF control section.

Figure 3:
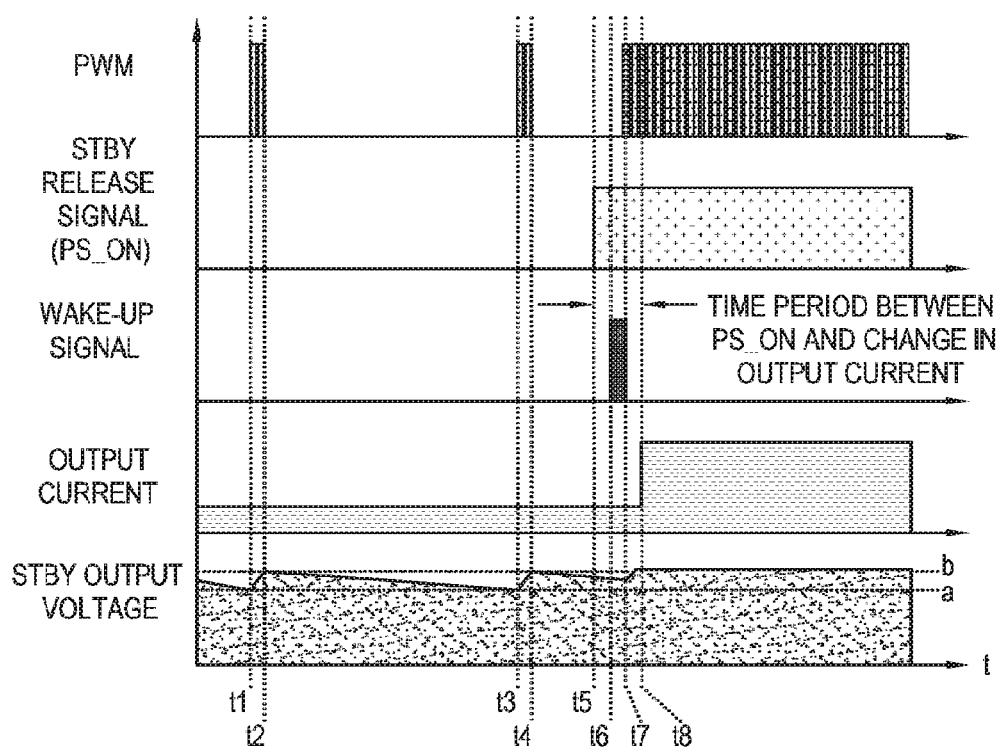
FIG. 3 is a view showing waveforms of signals corresponding to operations of a power supply according to an exemplary embodiment.
Figure 4:
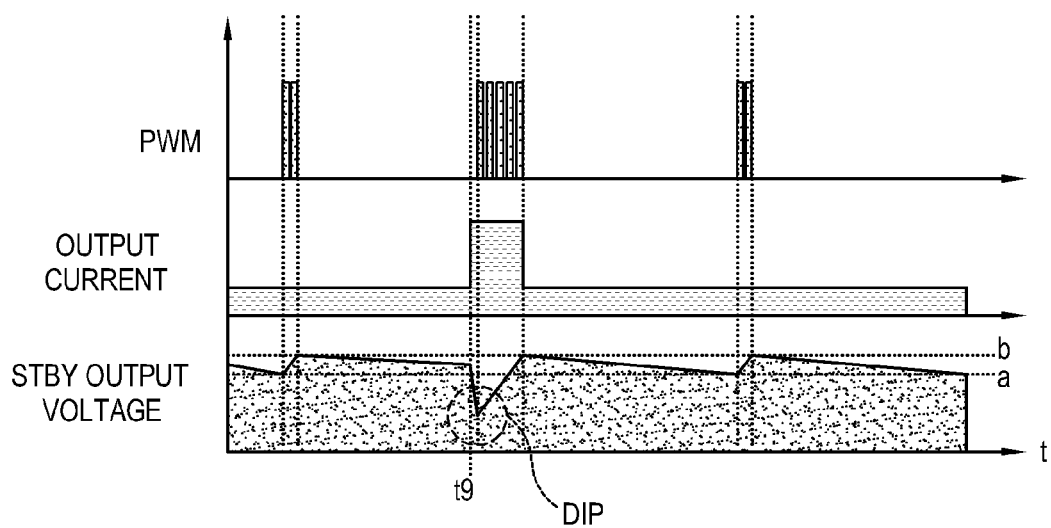
FIG. 4 is a view showing waveforms of signals of a conventional method in comparison with those of FIG. 3.

FIG. 3 is a view showing waveforms of signals corresponding to operations of the power supply 100 according to an exemplary embodiment; FIG. 4 is a view showing waveforms of signals of a conventional method in comparison with those of FIG. 3.

As shown in FIG. 3, in the ON/OFF control mode, the PWM operation is intermittently performed at points of time t1 and t3 where it is sensed that a standby voltage, i.e., a standby (STBY) output voltage is equal to or less than the first reference voltage a, thereby generating the PWM signal (i.e., an on section of the PWM signal). The standby voltage increases in accordance with the PWM operations, and therefore the PW operation is terminated (i.e., an off section of the PWM signal) when the STBY output voltage is higher than the second reference voltage b.

Thus, the PWM generator 120 has a nonlinear and irregular PWM cycle depending on conditions of the secondary output current, and such an intermittent PWM operation causes the STBY output voltage to have a waveform with ripples having a predetermined amplitude as shown in FIG. 3. Here, the STBY output voltage is controlled to maintain a specific level in accordance with the intermittent PWM operations of the PWM generator 120 even though the ripples are generated, so that the standby power can be stably supplied.

In this exemplary embodiment, the PWM generator 120 cuts the power off from being supplied to components except a feedback portion in such a manner that inner blocks, except a component for receiving feedback on the voltage of the secondary side, are disconnected during a section where the PWM operation is not performed in the ON/OFF control mode, i.e., during the PWM signal off section. Accordingly, leakage power is cut off while the PWM generator 120 does not perform any operation, and thus minimum power is consumed, thereby making it possible to achieve standby power of zero Watt (0 W). In this exemplary embodiment, the PWM generator 120 may be achieved by a 0.00 W PWM IC where a low current having a micro value ($\mu A$), for example, equal to or lower than 5 $\mu A$, flows.

The switch 130 is achieved by a switching device such as a metal oxide semiconductor field effect transistor (MOSFET), and the first converter 140 may be achieved by a transformer having primary and secondary winding wires.

The switch 130 performs a switching operation in accordance with outputs of the PWM generator 120, and therefore has a nonlinear switching cycle corresponding to a voltage level at the secondary side of the converter 140.

The output portion 150 includes a rectifier D1 and a capacitor C1. According to an exemplary embodiment, the power supply 100 makes the capacitor C1 maintain a state charged with a predetermined voltage so that a preset standby voltage (e.g., 3.3V, 5V, etc.) can be supplied to the system portion 200 when the electronic apparatus 1 is in the standby mode. Here, the capacitor C1 is achieved by a super capacitor and thus stably supplies the standby power to the system portion 200.

The controller 160 is achieved by a micro control unit (MCU), monitors the secondary voltage of the converter 140, and receives an external input signal (i.e., a PS_ON signal) from the system portion 200. Here, the controller 160 receives the PS_ON signal from the system portion 200 at a point of time t5 before a point of time t8 at which the output current is changed during the operation under the ON/OFF control mode as shown in FIG. 3. As the PS_ON signal is applied, the power supply 100 is released from the ON/OFF control mode.

Specifically, the controller 160 outputs a wake-up signal to the PWM generator 120 in response to an input signal from the exterior of the power supply 100. Here, the external input signal may be received from the system portion 200.

The external input signal, that is, the PS_ON signal may be applied in response to the system portion 200 is released from the standby mode. For example, when a user inputs a command for operating the electronic apparatus 1 to the system portion 200, the system portion 200 may apply the PS_ON signal at the point of time T5 before the point of time t8 at which the output current is changed.

Here, the external input signal may be applied in response to operations of other devices (not shown) than the electronic apparatus 1. For example, the external input signal may be applied in response to a command received from a remote controller separated from the TV if the electronic apparatus 1 is a TV, or a control of an input device connected to a computer if the electronic apparatus 1 is a monitor.

A point of time t4 when the external input signal is applied may be determined in consideration of a time period until the output current is varied after the PS_ON signal.

As shown in FIG. 3, if the PS_ON signal is applied at t5, the controller 160 transmits a wake-up signal to the PWM generator 120 at a point of time t6. The PWM generator 120 performs the PWM operation, and continuously generates the PWM signal at a point of time t7. Here, the continuously generated PWM signal may have a high-speed frequency. Accordingly, the STBY output voltage can be stably maintained even though the output current is varied at a point of time t8.

That is, according to an exemplary embodiment, if it is expected that the output current is varied with the release of the standby mode, the external input signal from the system portion 200 is applied before the expected point of time when the output current is varied, and the PWM generator 120 is woken up by the controller 160 and generates the PWM signal, thereby stably supplying the power without a dip, i.e., collapse of the output voltage due to variation in the output current as shown in FIG. 3 voltage.

On the contrary, referring to FIG. 4, a conventional case generates a dip where the output voltage is collapsed by the variation in the output current at a point of time t9.

In this exemplary embodiment, a mode where the PWM generator 120 is woken up and continuously performs the PWM operation as the external input signal is applied will be called a high speed PWM mode, and a section where the operation is performed in the high speed PWM mode will be called a high speed PWM section.

Accordingly, in the power supply 100 according to an exemplary embodiment, the PWM generator 120 is woken up as the external input signal is applied in the ON/OFF control mode and switched from the ON/OFF control mode to the high speed PWM mode, so that the PWM generator 120 can be controlled to continuously perform the PWM operation, thereby stably supplying the output voltage without any dip.

Figure 5:
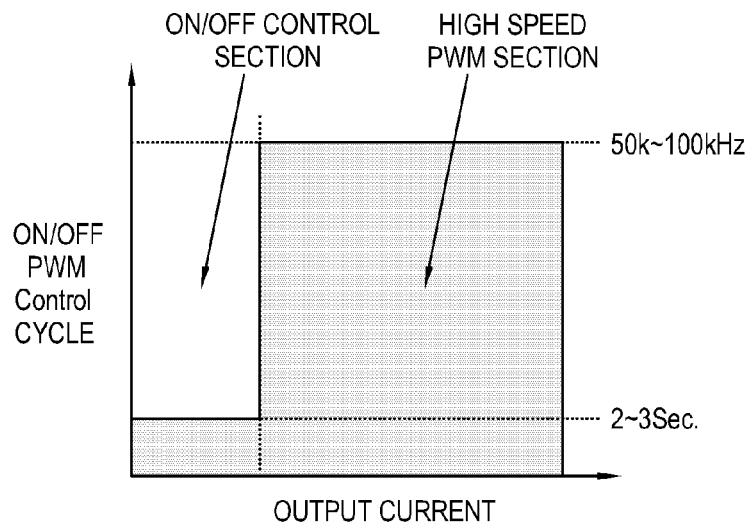
FIGS. 5 and 6 are views for explaining mode switching based on output currents in the power supply according to an exemplary embodiment.
Figure 6:
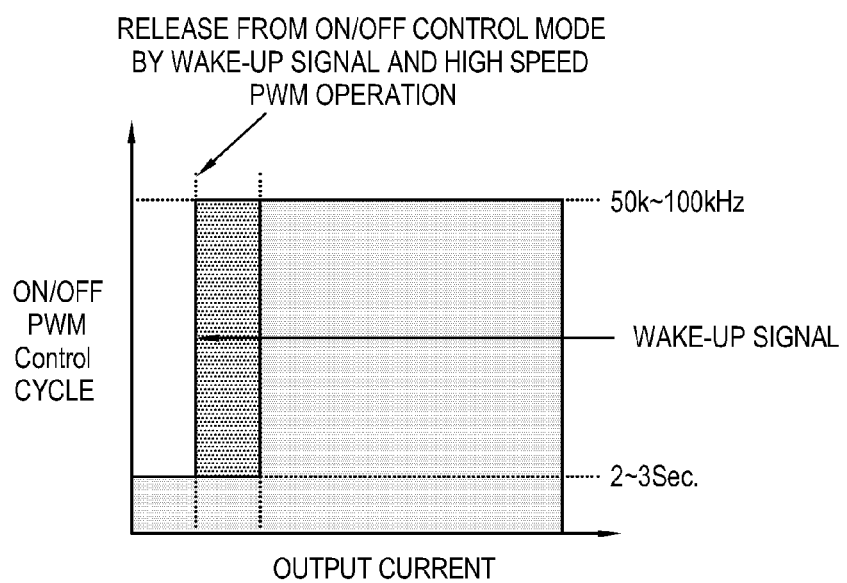

FIGS. 5 and 6 are views for explaining mode switching based on output currents in the power supply according to an exemplary embodiment.

As shown in FIGS. 5 and 6, the PWM operation cycle of the PWM generator 120 is changed to be nonlinear in accordance with conditions of the output current.

Specifically, if the output current is low as shown in FIG. 5, the operation frequency is minimized during the ON section where the operation is performed, and the internal blocks of the PWM generator 120 are all turned off during the OFF section, thereby operating in the ON/OFF PWM control mode for minimizing the leakage power.

Also, if the output current is high as shown in FIG. 5, the operation frequency becomes nonlinear to operate at the high speed PWM mode, thereby stably supplying the standby power. Here, the ON/OFF PWM control mode is released in response to the wake-up signal is applied to the PWM generator 120 before switching to the high speed PWM mode as shown in FIG. 6.

If it is determined that the STBY output voltage is stably supplied without any dip after switching to the high speed PWM mode, the controller 160 generates a signal PS_ON for turning on the output voltage needed for the system portion 200. Thus, the electronic apparatus 1 is switched from the standby mode to the normal mode, and the power is stably supplied to the system portion 200.

Below, a power controlling method of the electronic apparatus 1 according to an exemplary embodiment will be described with reference to the accompanying drawings.

Figure 7:
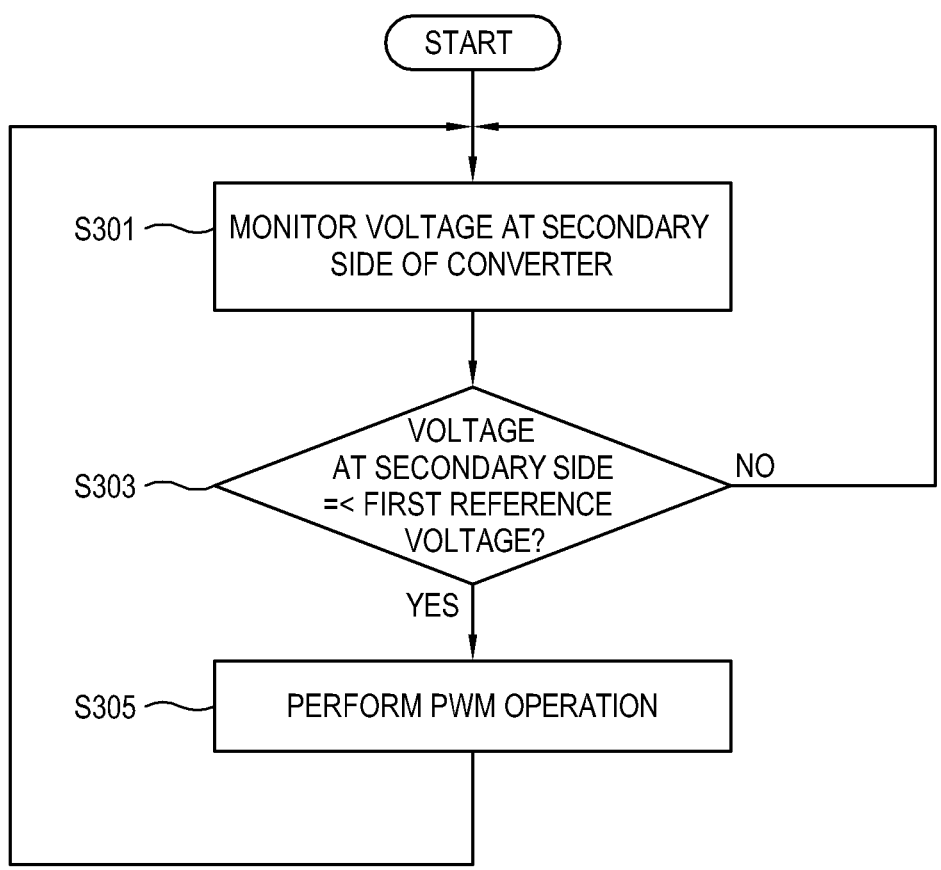
FIGS. 7 and 8 are flowcharts showing a power controlling method of the electronic apparatus according to an exemplary embodiment.
Figure 8:
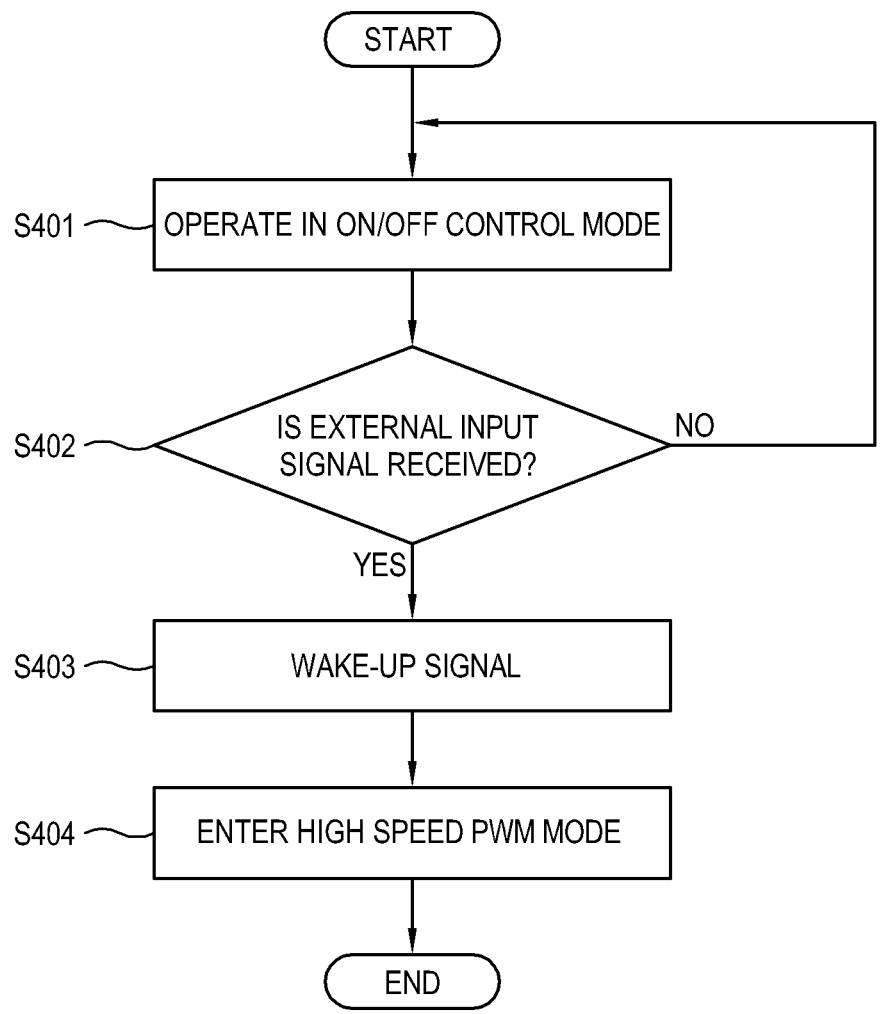

FIGS. 7 and 8 are flowcharts showing a power controlling method of the electronic apparatus according to an exemplary embodiment.

FIG. 7 shows a case where the power supply 100 operates under the ON/OFF control mode.

As shown in FIG. 7, the controller 160 of the power supply 100 of the electronic apparatus 1 according to an exemplary embodiment monitors the voltage at the secondary side of the converter 140 (S301). Here, the PWM generator 120 is in a turned-off state and thus the internal blocks thereof, except the components for receiving the feedback on the voltage at the secondary side, are not supplied with the power.

With the monitoring operation S301, the controller 160 can determine whether the voltage at the secondary side decreases to be equal to or lower than the preset first reference voltage (S303).

In the operation S303, if it is determined that the voltage at the secondary side of the converter 140 is equal to or lower than the first reference voltage, the PWM generator 120 is turned on and performs the PWM operation (S305).

In the operation S303, if it is determined that the voltage at the secondary side of the converter 140 is higher than the first reference voltage, the PWM generator 120 is maintained as it is turned off.

Therefore, in the ON/OFF control mode, the PWM generator 120 becomes turned on to intermittently perform the PWM operation only when the voltage at the secondary side of the converter 140 is equal to or lower than the first reference voltage, thereby minimizing the leakage power during the OFF section.

FIG. 8 shows that the power supply 100 is switched from the ON/OFF control mode to the high speed PWM mode.

As shown in FIG. 8, the power supply 100 of the electronic apparatus 1 according to an exemplary embodiment operates under the ON/OFF control mode (S401). In the ON/OFF control mode, the PWM operation of the PWM generator 120 is intermittently turned on in accordance with the voltage levels at the secondary side of the converter 140 as shown in FIG. 7.

While operating under the ON/OFF control mode in the operation S401, the controller 160 may receive the external input signal PS_ON from the system portion 200 (S403). In this exemplary embodiment, the system portion 200 senses a variation in the output current before the output current is changed and applies the external input signal PS_ON to the controller 160 before the point of time when the output current is changed.

If the external input signal PS_ON is applied in the operation S403, the controller 160 applies the wake-up signal to the PWM generator 120 (S404).

If the wake-up signal is applied to the PWM generator 120 in the operation S404, the ON/OFF control mode of S401 is released and the PWM generator 120 continuously performs the PWM operation, thereby making the power supply 100 switch to the high speed PWM mode.

Thus, if it is expected that the current is varied in the ON/OFF control mode, the PWM generator 120 performs the high speed PWM operation before the variation of the current, thereby preventing the system portion 200 from an error caused by a dip of voltage due to the current variation.

According to an exemplary embodiment, in the standby mode of the electronic apparatus 1, the PWM operation is intermittently performed in accordance with the voltage levels at the secondary side of the converter 140 without using a mechanical switch, so that the standby power needed for the system portion 100 can be stably supplied while maintaining the standby power consumed under the standby mode o be less 0.005 W that can be written as 0.00 W (i.e., zero watt). Accordingly, the standby power consumption of the electronic apparatus is minimized, thereby satisfying regulations complying with an energy-saving policy.

Also, if the current variation is expected, the PWM generator 120 is woken up by receiving the external input signal from the system portion 200 and performs the high speed PWM operation, thereby preventing the voltage collapse, i.e., the dip due to the current variation.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An electronic apparatus comprising:
   a system portion configured to operate with a received voltage; and
   a power supply, the power supply comprising:
   a pulse width modulation (PWM) generator configured to generate a PWM signal;
   a converter configured to transfer voltage from a primary side to a secondary side in accordance with an output voltage of the PWM generator;
   an output portion configured to supply voltage at the secondary side of the converter as a standby voltage to the system portion; and
   a controller configured to monitor the standby voltage at the secondary side of the converter and voltage of the system portion, and output a wake-up signal to the PWM generator when an external input signal is received from the system portion,
   wherein the PWM generator operates under an ON/OFF control mode to perform an intermittent PWM operation by receiving feedback on the standby voltage at the secondary side of the converter, the PWM signal is turned on/off in accordance with levels of the standby voltage at the secondary side, and the voltage being supplied to components, except, when the PWM signal is turned off, the voltage on the secondary side is only supplied to a component configured to monitor the feedback of the standby voltage,
   wherein the system portion applies the external input signal to the controller before a point of time when an output current of the power supply is varied, and, in response to the wake-up signal, the PWM generator is woken up and switched from the ON/OFF control mode to a high speed PWM mode so that the PWM generator is controlled to continuously perform the PWM operation rather than the intermittent PWM operation, and
   wherein the controller generates a signal for turning on the output voltage needed for the system portion in response to determining that the standby voltage is stably supplied after switching to the high speed PWM mode and the electronic apparatus is switched to a normal mode.

2. The electronic apparatus according to claim 1, wherein the PWM signal is turned on if the standby voltage at the secondary side is equal to or lower than a first reference voltage, and turned off if the standby voltage at the secondary side is higher than a second reference voltage during the operation under the ON/OFF control mode.

3. The electronic apparatus according to claim 1, wherein the power supply further comprises a switch configured to operate in accordance with outputs of the PWM generator, and the switch has a nonlinear switching cycle in accordance with voltage levels at the secondary side of the converter during the operation under the ON/OFF control mode.

4. The electronic apparatus according to claim 1, wherein the external input signal is input in response to releasing the system portion from a standby mode.

5. The electronic apparatus according to claim 1, wherein the PWM generator continuously generates the PWM signal during the operation under the high speed PWM mode.

6. The electronic apparatus according to claim 5, wherein the generated PWM signal has a high speed frequency.

7. A power controlling method of an electronic apparatus comprising a system portion configured to operate with received voltage, and a power supply comprising a pulse width modulation (PWM) generator generating a PWM signal and supply standby power to the system portion, the method comprising:
   monitoring a standby voltage at a secondary side of a converter that transfers a voltage from a primary side to the secondary side in accordance with output voltages of the PWM generator;
   operating under an ON/OFF control mode to perform an intermittent PWM operation by controlling the PWM signal to be turned on/off in accordance with levels of the standby voltage at the secondary side of the converter;
   receiving an external input signal from the system portion by the power supply, the external input signal being applied to a controller of the power supply before a point of time when an output current of the power supply is varied;
   outputting a wake-up signal to the PWM generator in response to the external input signal;

in response to the wake-up signal, waking up the PWM generator and switching from the ON/OFF control mode to a high speed PWM mode so that the PWM generator is controlled to continuously perform the PWM operation rather than the intermittent PWM operation; and generating a signal for turning on the output voltage needed for the system portion in response to determining that the standby voltage is stably supplied after switching to the high speed PWM mode and switching the electronic apparatus to a normal mode, wherein, when the PWM signal is turned off, the voltage at the secondary side is only supplied to a component configured to monitor the feedback of the standby voltage during the operation under the ON/OFF control mode.

8. The method according to claim 7, wherein the controlling the PWM signal to be turned on/off comprises turning on the PWM signal if the standby voltage at the secondary side is equal to or lower than a first reference voltage, and turning off the PWM signal if the standby voltage at the secondary side is higher than a second reference voltage during the operation under the ON/OFF control mode.

9. The method according to claim 7, wherein the power supply further comprises a switch operating in accordance with outputs of the PWM generator, and
the switch has a nonlinear switching cycle in accordance with standby voltage levels at the secondary side of the converter during the operation under the ON/OFF control mode.

10. The method according to claim 7, further comprising monitoring a voltage of the system portion.

11. The method according to claim 7, wherein the external input signal is input in response to releasing the system portion from a standby mode.

12. The method according to claim 7, further comprising:
continuously generating the PWM signal during the operation under the high speed PWM mode.

13. The method according to claim 12, wherein the generated PWM signal has a high speed frequency.

14. A power supply, comprising:
a pulse width modulation (PWM) generator configured to generate a PWM signal;
a converter configured to transfer a voltage generated in accordance with the PWM signal from a first side of the power supply to a second side of the power supply;
an output portion configured to rectify the voltage at the second side to output a standby voltage; and
a controller configured to monitor the standby voltage at the secondary side of the power supply and output a wake-up signal to the PWM generator when an external input signal is received from a system portion,
wherein the PWM generator operates under an ON/OFF control mode to perform an intermittent PWM operation by receiving feedback of the standby voltage from the second side and turns the PWM signal on or off in accordance with the feedback of the standby voltage,
the PWM signal is turned on if the feedback of the standby voltage at the second side is equal to or lower than a first threshold voltage,
the PWM signal is turned off if the feedback of the standby voltage at the second side is higher than a second threshold voltage,
wherein the external input signal is applied before a point of time when an output current of the power supply is varied, and, in response to the wake-up signal, the PWM generator is woken up and switched from the ON/OFF control mode to a high speed PWM mode so that the PWM generator is controlled to continuously perform the PWM operation rather than the intermittent PWM operation, and
wherein the controller generates a signal for turning on the output voltage needed for the system portion in response to determining that the standby voltage is stably supplied after switching to the high speed PWM mode and the electronic apparatus is switched to a normal mode.

15. The power supply of claim 14, wherein the system portion is configured to receive the standby voltage from the output portion and apply the external input signal to the controller.

16. The power supply of claim 15, wherein the controller further configured to receive the external input signal from the system portion, wherein the PWM generator continuously generates the PWM signal during the operation under the high speed PWM mode.

17. A method of controlling a power supply, the method comprising:
generating a PWM signal;
transferring a voltage generated in accordance with the PWM signal from a first side of the power supply to a second side of the power supply;
rectifying the voltage at the second side to output a standby voltage;
receiving feedback of the voltage from the second side;
operating under an ON/OFF control mode to perform an intermittent PWM operation with a PWM generator by turning the PWM signal on or off in accordance with the feedback of the voltage;
receiving an external input signal from a system portion by the power supply, the external input signal being applied to a controller of the power supply before a point of time when an output current of the power supply is varied;
outputting a wake-up signal to the PWM generator in response to the external input signal;
in response to the wake-up signal, waking up the PWM generator and switching from the ON/OFF control mode to a high speed PWM mode so that the PWM generator is controlled to continuously perform the PWM operation rather than the intermittent PWM operation, wherein the PWM signal being turned on if the voltage at the second side is equal to or lower than a first threshold voltage, and the PWM signal is turned off if the voltage at the first side is higher than a second threshold voltage during the operation under the ON/OFF control mode; and
generating a signal for turning on the output voltage needed for the system portion in response to determining that the standby voltage is stably supplied after switching to the high speed PWM mode and switching the electronic apparatus to a normal mode.

18. The method of claim 17, further comprising outputting the standby voltage to the system portion during the operation under the ON/OFF control mode.

19. The method of claim 18, further comprising monitoring the voltage at the second side; and
wherein the PWM generator continuously generates the PWM signal during the operation under the high speed PWM mode.

* * * * *